(12) United States Patent
Ochiai

(10) Patent No.: US 9,330,025 B2
(45) Date of Patent: May 3, 2016

(54) INFORMATION PROCESSING APPARATUS, MEMORY CONTROL APPARATUS, AND CONTROL METHOD THEREOF

(71) Applicant: CANON KABUSHIKI KAISHA, Tokyo (JP)

(72) Inventor: Wataru Ochiai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 313 days.

(21) Appl. No.: 13/952,458

(22) Filed: Jul. 26, 2013

(65) Prior Publication Data

US 2014/0047206 A1 Feb. 13, 2014

(30) Foreign Application Priority Data

Aug. 8, 2012 (JP) ................. 2012-176027

(51) Int. Cl.
*G06F 12/02* (2006.01)
*G06F 12/14* (2006.01)
*G06F 13/18* (2006.01)

(52) U.S. Cl.
CPC ............... *G06F 12/14* (2013.01); *G06F 13/18* (2013.01)

(58) Field of Classification Search
CPC .................. G06F 13/18; G06F 12/14
See application file for complete search history.

(56) References Cited

U.S. PATENT DOCUMENTS

| 6,253,297 B1* | 6/2001 | Chauvel et al. ............... 711/167 |
| 2005/0005035 A1* | 1/2005 | Herczog ......................... 710/22 |
| 2010/0306458 A1* | 12/2010 | Aho et al. ..................... 711/105 |

FOREIGN PATENT DOCUMENTS

| JP | 2006-250555 A | 9/2006 |
| JP | 2011-165105 A | 8/2011 |

* cited by examiner

*Primary Examiner* — Hiep Nguyen
(74) *Attorney, Agent, or Firm* — Canon USA, Inc. IP Division

(57) ABSTRACT

A memory control circuit is configured to take a priority for each transfer instruction into account but not the priority in a memory access unit, and thus processing of a high-priority transfer instruction received during a memory access needs to wait for a long time. The memory control apparatus divides the received transfer instruction into a memory access unit and, when the transfer instruction having a higher priority is received during the memory access, the memory access based on a low-priority transfer instruction is interrupted and starts the memory access based on the high-priority transfer instruction.

20 Claims, 11 Drawing Sheets

FIG. 2

| TRANSFER REQUEST | ADDR | ADDRESS |
|---|---|---|
| | LEN | BURST LENGTH |
| | PRI | PRIORITY |
| | DIR | READ/WRITE |

| MEMORY ACCESS REQUEST | CS | CHIP SELECT |
|---|---|---|
| | BANK | BANK ADDRESS |
| | ROW | ROW ADDRESS |
| | COL | COLUMN ADDRESS |
| | DIR | READ/WRITE |

| MEMORY COMMAND | CSn | COMMAND |
|---|---|---|
| | RASn | |
| | CASn | |
| | WEn | |
| | BA | BANK ADDRESS |
| | ADDR | ROW ADDRESS/COLUMN ADDRESS |

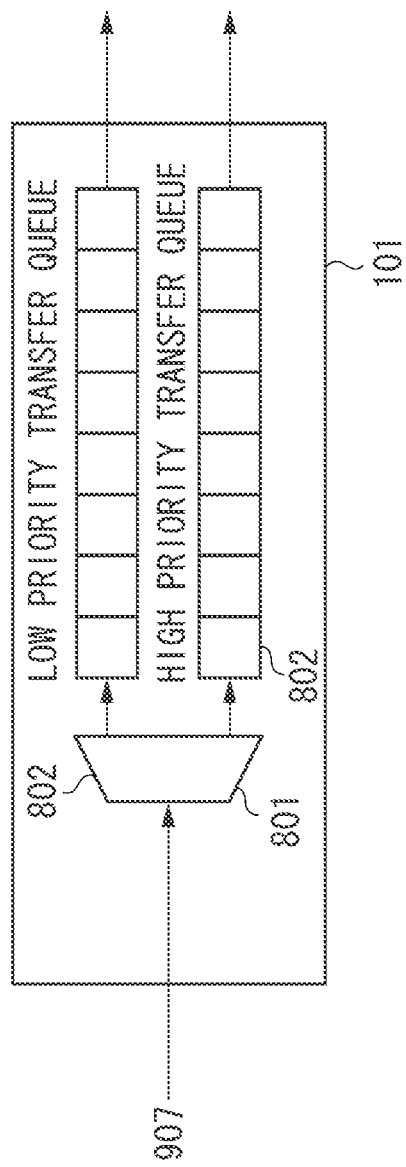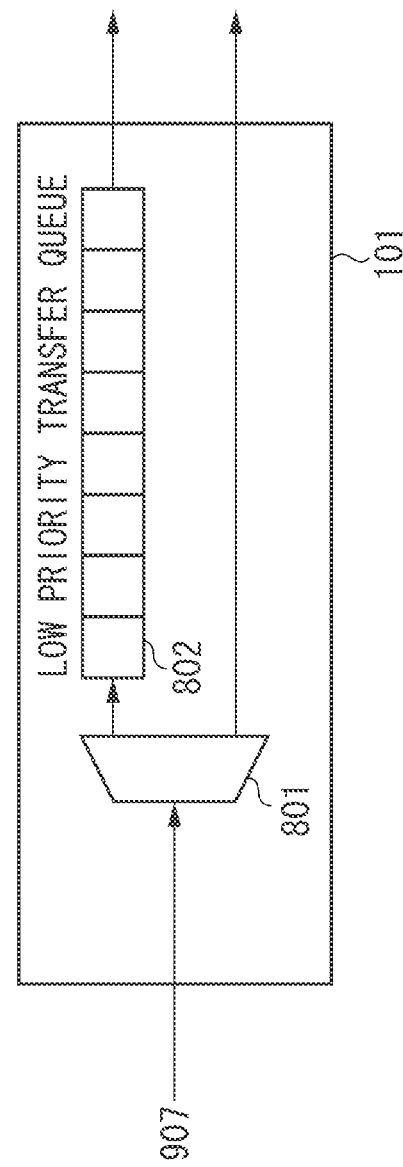

INFORMATION PROCESSING APPARATUS, MEMORY CONTROL APPARATUS, AND CONTROL METHOD THEREOF

BACKGROUND OF THE INVENTION

1. Field of the Invention

The present invention relates to an information processing apparatus that controls memory access according to a priority of transfer and a memory controller memory control circuit, and a control method thereof.

2. Description of the Related Art

In recent years, a memory system in which a plurality of masters shares one memory via an on-chip bus has been mainly used. In such a system, each master asynchronously issues transfer. However, each master performs various types of transfers, for example, a certain latency should be satisfied, or a certain transmission band should be satisfied. The transfer requiring guarantee of the latency is treated as a high-priority transfer, and various types of methods are provided for processing the high-priority transfer earlier than other transfers.

For example, Japanese Patent Application Laid-Open No. 2011-165105 discusses a method in which a memory control circuit provides a transfer queue requiring calculation of latency and a transfer queue not requiring it, and determines, depending on a status, which transfer instruction held by queues is to be taken to access a memory. Further, Japanese Patent Application Laid-Open No. 2006-250555 discusses a method in which a queue holding the transfer is provided for each address region to which the memory control circuit access, and performs a memory accesses from the high-priority transfer of the queue in an access region.

In a case where a transfer unit from the on-chip bus to the memory control circuit is different from the transfer unit from the memory control circuit to the memory, the transfer from the on-chip bus is required to be divided and adjusted. More specifically, to realize the transfer of one transfer unit from the on-chip bus, the memory control circuit is required to issue a plurality of memory access commands.

However, in the methods discussed in Japanese Patent Application Laid-Open No. 2011-165105 and Japanese Patent Application Laid-Open No. 2006-250555, the methods are not configured to be capable of taking into account the priority of the memory access that is divided and issued. Therefore, if a memory access request having a low priority is received from the on-chip bus and divided into a plurality of memory access commands, even if another memory access request having the high priority is received, until the memory access is completed based on the plurality of memory access commands generated from the memory access request having the low priority, processing on the memory access request having the high priory cannot be started.

For example, 8-beat transfer is performed from the on-chip bus and it is divided into two memory access commands, and four cycles are required to access a memory. Since the two memory accesses are continuously processed, subsequent transfer is not processed during eight cycles. On the other hand, if 128-beat transfer is performed from the on-chip bus, it is divided into 32 memory accesses. If each requires four cycles, the subsequent transfer is not processed during 128 cycles. As described above, even if the subsequent transfer has the high priority, another transfer cannot be processed while the divided memory accesses are executed, and thus the transfer having the high priority does not have a high transfer efficiency.

SUMMARY OF THE INVENTION

According to an aspect of the present invention, a memory control apparatus configured to issue a plurality of memory commands in a memory access unit based on a transfer instruction, the memory control apparatus includes a reception unit configured to receive a transfer instruction, a plurality of output units configured to each hold at least one transfer instruction and an output status based on the transfer instruction, and, based on the transfer instruction, each output a plurality of memory access requests in a memory access unit, and a command generation unit configured to, based on the memory access request, issue a memory command to a memory device, wherein the command generation unit configured to issue a memory command that is received by the reception unit after a first transfer instruction and is based on a memory access request related to a second transfer instruction held by a second output unit so as to allow the memory command to cut in on a plurality of memory commands based on a plurality of memory access requests related to the first transfer instruction held by a first output unit.

Further features and aspects of the present invention will become apparent from the following detailed description of exemplary embodiments with reference to the attached drawings.

BRIEF DESCRIPTION OF THE DRAWINGS

FIG. 2 is a schematic view illustrating content of a transfer request, a memory access request, and a memory command.

FIGS. 8A and 8B are block diagrams illustrating a configuration of a transfer distribution circuit.

DESCRIPTION OF THE EMBODIMENTS

Figure 9:
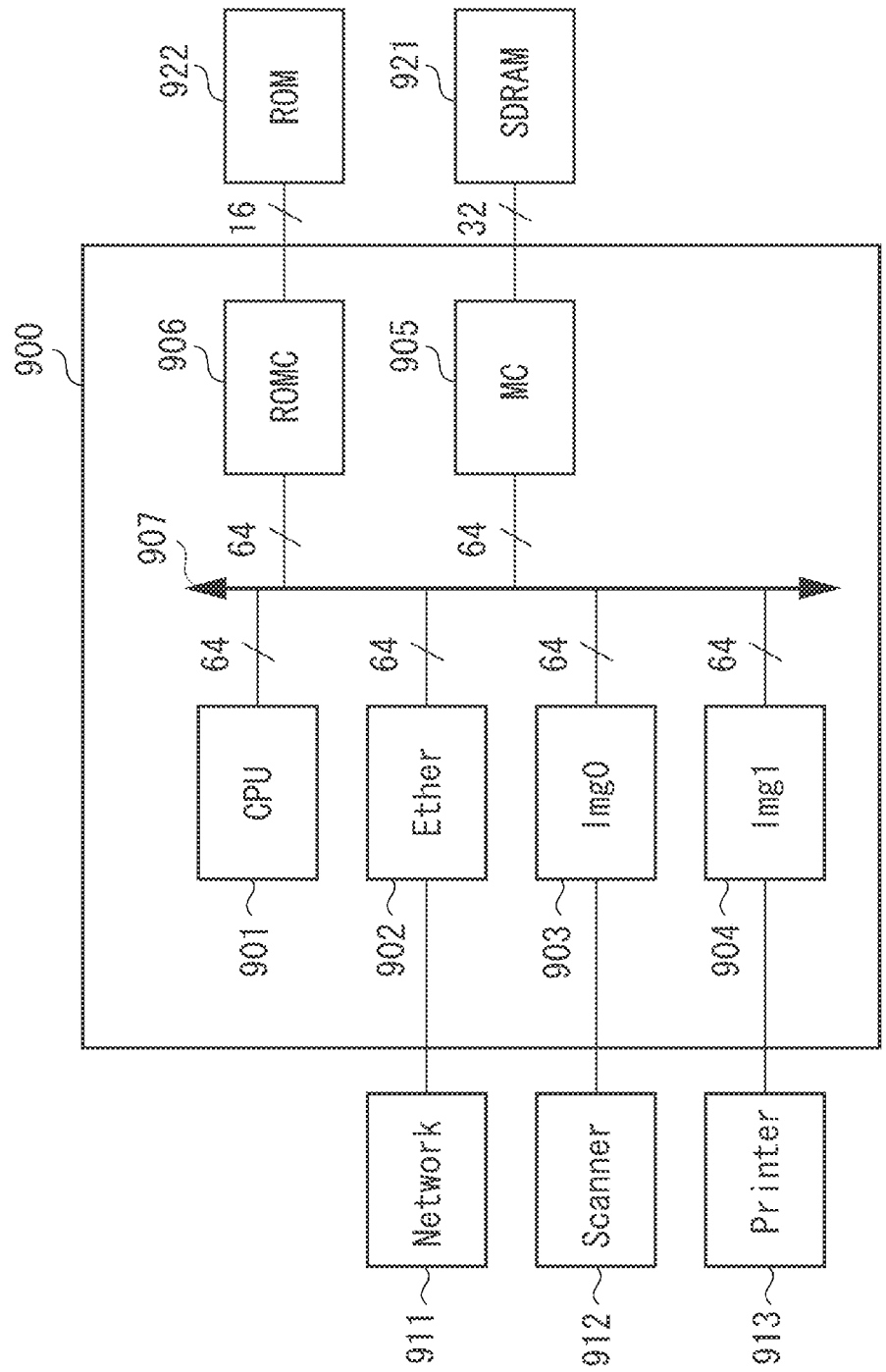
FIG. 9 is a block diagram illustrating a schematic configuration of an information processing apparatus.

FIG. 9 illustrates a schematic configuration of an information processing apparatus according to an exemplary embodiment of the present invention. The information processing apparatus is a printer having a copy function, and includes a large scale integration (LSI) 900 and a device connected thereto. The LSI 900 includes a central processing unit (CPU) 901, an Ethernet (registered trademark) controller 902, two image processing circuits 903 and 904, a synchronous dynamic random access memory (SDRAM) control circuit (memory control circuit) 905, a read-only memory (ROM) control circuit 906, and an on-chip bus 907 connecting the configurations 901 to 906 with one another. The device connected to the LSI 900 includes a network device 911, a scan device 912, a printer device 913, an SDRAM device 921, and a ROM device 922.

The ROM device 922 stores a program performed by the CPU 901, and a system is activated by the CPU 901 reading and executing the program. The network device 911 and the scan device 912 input data to be printed into the LSI 900. The data from the network device 911 is transmitted by the Ethernet (registered trademark) controller 902 to the memory control circuit 905. The image processing circuit 903 performs image processing (conversion processing to an image processing color space, shading correction, filter processing, and the like) on the data from the scan device 912, and the processed data is transmitted to the memory control circuit 905. The memory control circuit 905 writes the data into the SDRAM device 921 via a memory bus and reads the data held by the SDRAM device 921. The data stored in the SDRAM device 921 is read by the image processing circuit 904 via the memory control circuit 906, the image processing for printing (conversion processing to a printing color space, gamma correction, and the like) is performed on the data, and then transmitted to the printer device 913.

Figure 1:
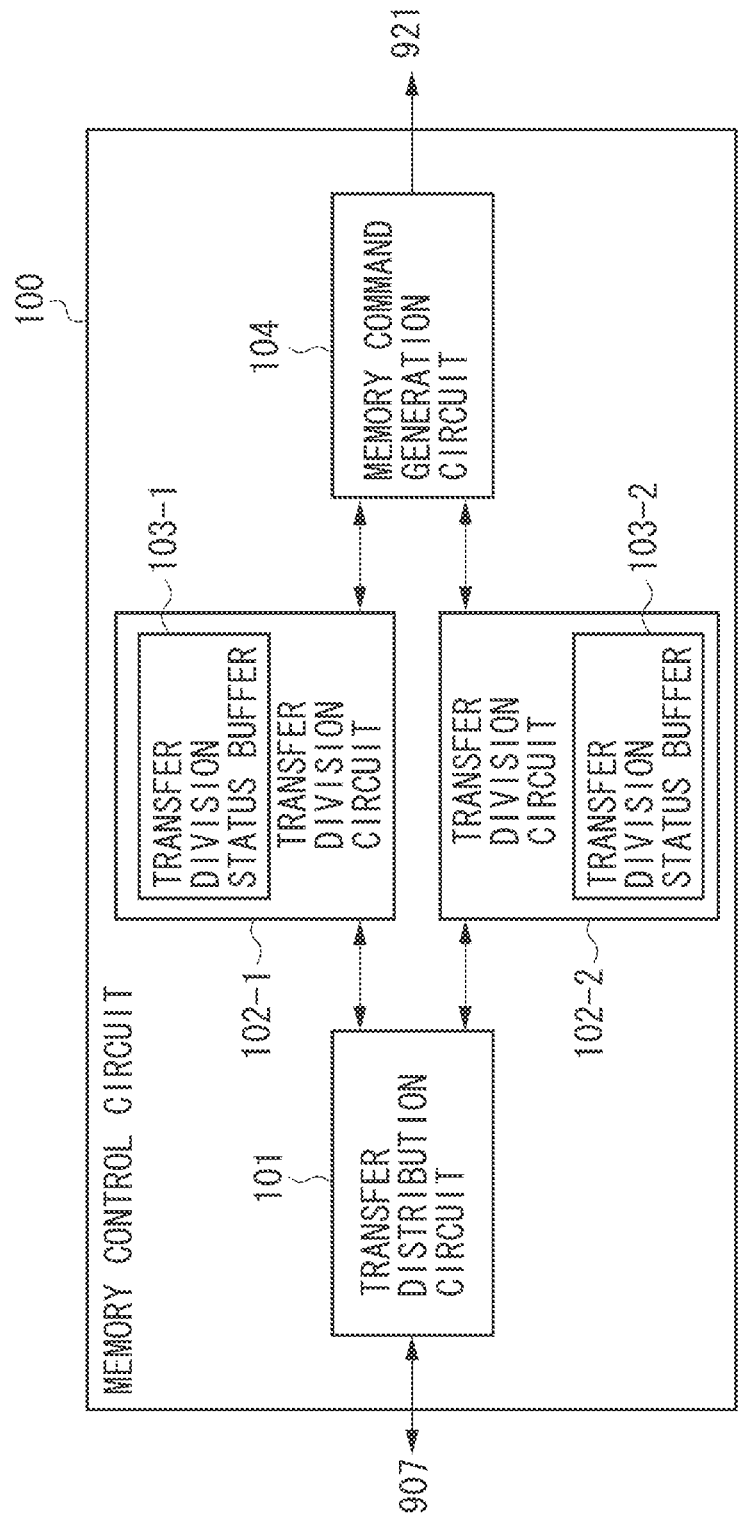
FIG. 1 is a block diagram illustrating a schematic configuration of a memory control circuit.

Subsequently, with reference to FIG. 1, a schematic configuration of the memory control circuit 905 illustrated in FIG. 9 will be described as a memory control circuit 100. As illustrated in FIG. 1, the memory control circuit 100 includes a transfer distribution circuit 101 and two transfer division circuits 103-1 and 103-2, and a memory command generation circuit 104. In the subsequent description, to describe various signals separately, a transfer request received by the transfer distribution circuit from an upper stream and information distributed by the transfer distribution circuit to the transfer division circuit are referred to as a transfer instruction (transfer division request). Further, information issued by a transfer division circuit 102 to the memory command generation circuit 104 is referred to as a memory access request, and information issued by the memory command generation circuit 104 to a memory device (double data rate (DDR)-SDRAM and the like) is referred to as a memory command (read command and write command). To simplify the description, all of the "transfer instruction, memory access request, and memory command" relate to data transfer in a direction of writing into a memory or reading therefrom.

The transfer distribution circuit 101 distributes the transfer instruction from the on-chip bus 907 in the upper stream to the transfer division circuit 102 according to the priority. For example, a low-priority transfer instruction is transmitted to the transfer division circuit 102-1 and the high-priority transfer instruction is transmitted to the transfer division circuit 102-2.

Each of the transfer division circuits 102-1 and 102-2 outputs the memory access request in a memory access unit (burst access unit, predetermined unit) based on the transfer instruction received from the transfer distribution circuit 101. At this point, depending on a length (corresponding to a bit length) of the transfer request, plurality of memory access requests is separately output. If a minimum transfer unit (first transfer unit) of the on-chip bus is larger than the memory access unit (second transfer unit), it should be divided. The memory command generation circuit 104 selects the memory access request having the high priority from among the memory access requests output from the plurality of the transfer division circuits 102-1 and 102-2, and issues the memory command to the memory device based on the selected memory access request. Therefore, the memory access request having the high priority is preferentially processed.

According to the present exemplary embodiment, one memory access corresponds to a 4-beat transfer from the on-chip bus. If the memory control circuit 100 receives a 16-beat transfer instruction from the on-chip bus, the transfer division circuit 102 takes out "an amount of 4 beats from a top" of the 16-beat transfer instruction to generate the memory access request. Subsequently, the transfer division circuit 102 takes out "the fifth beat from the top to the eighth beat therefrom" of the 16-beat transfer instruction and generates the memory access request. By repeatedly performing the processing described above, the transfer instruction is divided (converted) into the plurality of memory access requests. Each time the transfer division circuit 102 divides the transfer instruction from the on-chip bus, the transfer division circuit 102 makes the transfer division status buffer (status holding unit) 103 hold information (division status information and processing status) indicating how much the processing (divided memory access) has been performed. At this point, the burst length ("8" if the division processing has been performed on 16 beats for two memory access requests) of the transfer that is not divided is stored and it is decremented each time the division processing is performed. By holding the information about how much the division processing has been performed, the division processing can be interrupted and resumed.

Figure 3:
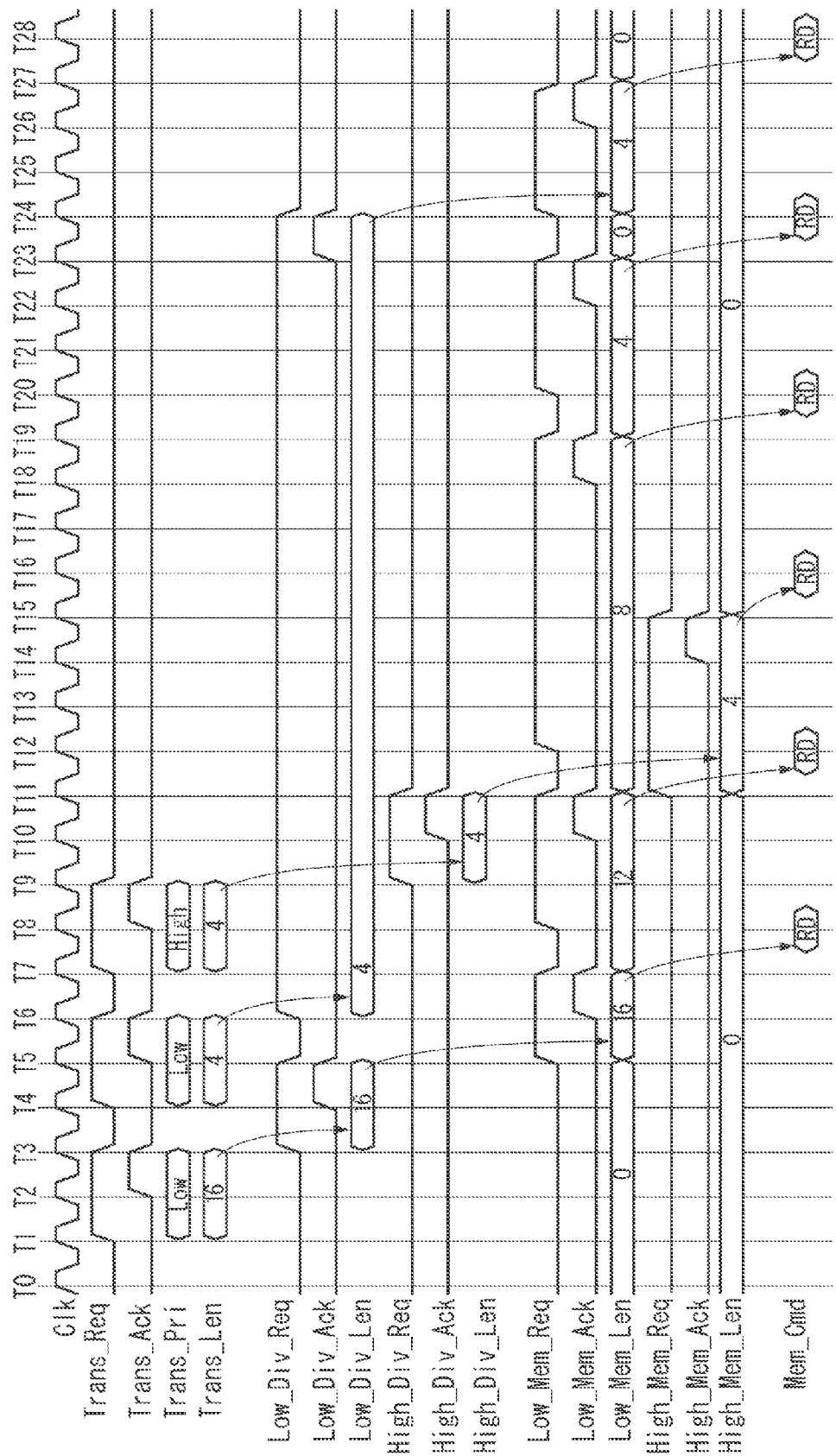
FIG. 3 is a timing chart illustrating operational waveforms of the memory control circuit.

FIG. 3 is a timing chart illustrating operational waveforms of various types of signals relating to the memory control circuit 100 according to the present exemplary embodiment. A horizontal axis indicates time transition (clock cycle time), and a vertical axis indicates waveforms or held values of the various types of the signals. An example is indicated in which the memory control circuit 100 receives three transfer instructions (transfer instructions A to C) from the on-chip bus and performs processing. The transfer instruction A (first transfer instruction) has the low priority, and its burst length is 16. The transfer instruction B (second transfer instruction) has the low priority and its burst length is 4. The transfer instruction C has the high priority and its burst length is 4. To simplify the description, the transfer instructions A to C are defined as read access to the memory, however, other commands may also be included. Further, an amount of data for one memory access corresponds to an amount of data for 4 beats of the on-chip bus, and 4 cycles are required for memory access.

Various types of signals illustrated along the vertical axis in FIG. 3 will be described.

A Clk signal indicates a clock supplied to the memory control circuit 100. A Trans_Req signal indicates the transfer instruction and is input into the transfer distribution circuit 101 from the on-chip bus. A Trans_Ack signal is a response signal indicating from the transfer distribution circuit 101 to the on-chip bus that the transfer instruction has been received. Based on the Trans_Ack signal, a bus master connected to the on-chip bus transmits a subsequent transfer. Similarly, a subsequent Ack signal is a reception signal for hand-shaking.

A Trans_Pri signal indicates the priority of the transfer instruction and is input from the on-chip bus to the transfer distribution circuit 101 in parallel to the Trans_Req signal. A Trans_Len signal indicates the burst length of the transfer instructions, and is input from the on-chip bus to the transfer distribution circuit 101 in parallel to the Trans_Req signal.

A Low_Div_Req signal indicates a request for dividing the low-priority transfer instruction, and is output by the transfer distribution circuit 101 to the transfer division circuit 102-1. A Low_Div_Ack signal indicates that the transfer division circuit 102-1 has received a transfer instruction of a target to be divided, and is output by the transfer division circuit 102-1 to the transfer distribution circuit 101. A Low_Div_Len signal indicates the burst length of the low-priority transfer instruction.

A High_Div_Req signal indicates a request for dividing the high-priority transfer instruction, and is output by the transfer distribution circuit 101 to the transfer division circuit 102-2. A High_Div_Ack signal indicates that the transfer division circuit 102-2 has received the target transfer instruction to be divided, and is output by the transfer division circuit 102-2 to the transfer distribution circuit 101. A High_Div_Len signal indicates the burst length of the high-priority transfer instruction.

A Low_Mem_Req signal indicates a memory access request based on the low-priority transfer instruction, and is output by the transfer division circuit 102-1 to the memory command generation circuit 104. A Low_Mem_Ack signal indicates that the memory command generation circuit 104 has received the memory access request for the low-priority transfer instruction, and is output by the memory command generation circuit 104 to the transfer division circuit 102-1. A Low_Mem_Len signal is a value held by the transfer division status buffer 103-1, corresponds to a proceeding status of the division memory access having the low priority, and indicates a rest of the burst length.

A High_Mem_Req signal indicates the memory access request based on a high-priority transfer instruction, and is output by the transfer division circuit 102-2 to the memory command generation circuit 104. A High_Mem_Ack signal indicates that the memory command generation circuit 104 has received the memory access request for the high-priority transfer instruction, and is output by the memory command generation circuit 104 to the transfer division circuit 102-2. A High_Mem_Len signal is a value held by the transfer division status buffer 103-2, corresponds to the proceeding status of the division memory access having the high priority, and indicates the rest of the burst length herein. A Mem_Cmd signal indicates the memory command issued by the memory command generation circuit 104 to the memory device.

Subsequently, transition of various types of signals for each clock cycle will be described in an order of transition.

At T0, a bus master (not illustrated) issues the transfer request for the transfer instruction A to the on-chip bus. Various types of buffers are set to "0" to be cleared. Further, at T2, the Trans_Req signal indicating the transfer instruction A from the on-chip bus to the memory access control circuit 100 is asserted (at T1, the Trans_Req signal is not activated, and thus not recognized).

At T3, the memory control circuit 100 asserts the Trans_Ack signal to the on-chip bus in the upper stream, and then reception of the transfer instruction A is completed. At this point the transfer distribution circuit 101 recognizes that the transfer instruction A has the low priority based on the Trans_Pri signal, and recognizes that the burst length of the transfer instruction A is 16 based on the Trans_Len signal.

At T4, the transfer distribution circuit 101 transmits the Low_Div_Req signal and the Low_Div_Len signal to the transfer division circuit 102-1 based on the recognized priority of the transfer instruction A.

At T5, further, from the on-chip bus to the memory control circuit 100, the Trans_Req signal, the Trans_Pri signal, and the Trans_Len signal for the transfer instruction B having the low priority are input. On the other hand, as for the transfer instruction A, the transfer division circuit 102-1 asserts the Low_Div_Ack signal to the transfer distribution circuit 101, and starts the division processing of the transfer instruction A.

At T6, as for the transfer instruction B, the memory control circuit 100 asserts the Trans_Ack signal to notify that the transfer instruction B has been received. On the other hand, as for the transfer instruction A, the transfer division circuit 102-1 asserts the Low_Mem_Req signal to issue the memory access request to the memory command generation circuit 104. Further, at this point, as the rest of the burst length of the transfer division status buffer 103-1, 16 is set for the Low_Mem_Len signal.

At T7, as for the transfer instruction B, the transfer distribution circuit 101 recognizes that the transfer instruction B has the low priority, asserts the Low_Div_Req signal, and then transmits it to the transfer division circuit 102-1. Since the Low_Mem_Len signal of the transfer division status buffer 103-1 is not "0", the transfer division circuit 102-1 does not assert the Low_Div_Ack signal. On the other hand, as for the transfer instruction A, the memory command generation circuit 104 confirms that the High_Mem_Req signal from the transfer division circuit 102-2 is not asserted, and then asserts the Low_Mem_Ack signal to the transfer division circuit 102-1.

At T8, the Trans_Req signal, the Trans_Pri signal and the Trans_Len signal indicating the transfer instruction C having the high priority are input into the memory control circuit 100 from the on-chip bus. On the other hand, as for the transfer instruction A, in response to assertion of the Low_Mem_Ack signal, the Low_Mem_Len signal of the transfer division status buffer 103-1 is decremented by four. In parallel to this processing, the memory command generation circuit 104 issues to the memory device a first read command, of a plurality of read commands to be generated based on the transfer instruction A. As for the transfer instruction B, the processing is kept waiting since the division processing (during division memory access) of the transfer instruction A is being performed.

At T9, as for the transfer instruction C, the memory control circuit 100 asserts the Trans_Ack signal to receive the transfer instruction C. On the other hand, as for the transfer instruction A, the transfer division circuit 102-1 continuously asserts the Low_Mem_Req signal to issue the memory access request to the memory command generation circuit 104.

At T10, as for the transfer instruction C, the transfer distribution circuit 101 recognizes that the transfer instruction C has the high priority, and transmits the High_Div_Req signal and the High_Div_Len signal to the transfer division circuit 102-2. On the other hand, as for the transfer instruction A, since the memory command generation circuit 104 requires four cycles for the previous memory access, it does not assert the Low_Mem_Ack signal.

AT T11, as for the transfer instruction C, the transfer division circuit 102-2 asserts the High_Div_Ack signal to start dividing the transfer instruction C. On the other hand, as for the transfer instruction A, the memory command generation circuit 104 confirms that the High_Mem_Req signal from the transfer division circuit 102-2 is not asserted, and then asserts the Low_Mem_Ack signal to the transfer division circuit 102-1.

At T12, as for the transfer instruction C, the transfer division circuit 102-2 asserts the High_Mem_Req signal to issue the generated memory access request to the memory command generation circuit 104. Since the memory command generation circuit 104 requires four cycles for the previous memory access, it does not assert the High_Mem_Ack signal. On the other hand, as for the transfer instruction A, in response to the assertion of the Low_Mem_Ack signal, the Low_Mem_Len signal of the transfer division status buffer 103-1 is decremented by four. In parallel to this processing, the memory command generation circuit 104 issues to the memory a second read command generated based on the transfer instruction A. As described above, the transfer division circuit 102-2 attempts to allow the divided memory access of the high-priority transfer to cut in. When the memory access is being actually performed, the memory command generation circuit 104 suspends to receive the cutting-in.

At T15, both of the Low_Mem_Req signal from the transfer division circuit 102-1 and the High_Mem_Req signal from the transfer division circuit 102-2 are asserted to the memory command generation circuit 104. The memory command generation circuit 104 asserts the High_Mem_Ack signal to the transfer division circuit 102-2 having the high priority. The High_Mem_Ack signal indicates that the interruption can be substantially received.

At T16, the division memory access for the transfer instruction A is interrupted. As for the transfer instruction C, in response to the assertion of the High_Mem_Ack signal, the High_Mem_Len signal of the transfer division status buffer 103-2 is decremented by four. In parallel to this processing, the memory command generation circuit 104 issues to the memory device a read command generated by dividing the transfer instruction C. As a result of the decrement, the High_Mem_Len signal of the transfer division status buffer 103-2 becomes "0", which indicates that the memory access for the transfer instruction C is completed.

Subsequently, between T19 and T24, the memory access for the transfer instruction A is resumed. The memory access request for the rest of the transfer instruction A is received by the memory command generation circuit 104, and the rest of the read command based on the transfer instruction A is repeatedly issued to the memory device. At T24, as for the transfer instruction A, the Low_Mem_Len signal becomes "0", which indicates that the memory access for the transfer instruction A is completed.

At T27, the transfer division circuit 102-1 asserts the Low_Div_Ack signal, and the memory access request based on the transfer instruction B is selected by the memory command generation circuit 104. At T28, the read command for the transfer instruction B is issued to the memory device. At this point, the Low_Mem_Len signal becomes "0", which indicates that the memory access for the transfer instruction B is completed.

FIG. 2 illustrates the content of the transfer instruction, the memory access request, and the memory command.

The transfer instruction includes information about ADDR indicating an access start address, LEN indicating the burst length, PRI indicating the priority, and DIR indicating reading or writing.

The memory access request includes information about CS indicating chip select of the DRAM, BANK indicating a bank address of the DRAM, ROW indicating a row address of the DRAM, COL indicating a column address of the DRAM, and DIR indicating reading or writing.

The memory command includes information about CSn, RASn, CASn, and WEn that each indicate the command of the DRAM, BA indicating a target bank of the command, and ADDR indicating a target address thereof. Typical memory commands are described below.

If CSn=1, the command is invalid.

If CSn=0, RASn=0, CASn=1, and WEn=1, an active (ACT) command is indicated. At this point, the BA indicates a bank to be active, and the ADDR indicates a row address to be active. The row address specified herein is valid until the bank becomes idle by a precharge (PRE, PREA) command. Therefore, when another row address is specified, the precharge command is once input.

If CSn=0, RASn=1, CASn=0, and WEn=1, the read command is indicated. At this point, the BA indicates the bank to be read, and the ADDR indicates the column address to be read.

If CSn=0, RASn=1, CASn=0, and WEn=0, the write command is indicated. At this point, the BA indicates the bank to be written, and the ADDR indicates the column address to be written.

As the memory command, the command specified by the known SDRAM (DDR1 to 4) may be included.

Figure 10A:
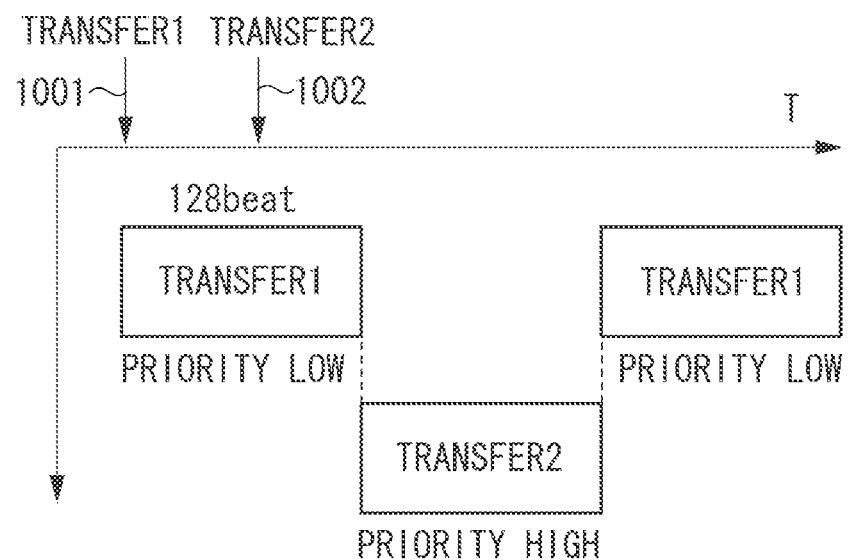
FIGS. 10A and 10B are pattern diagrams illustrating statuses where a conventional memory control circuit processes two transfers having different priorities.
Figure 10B:
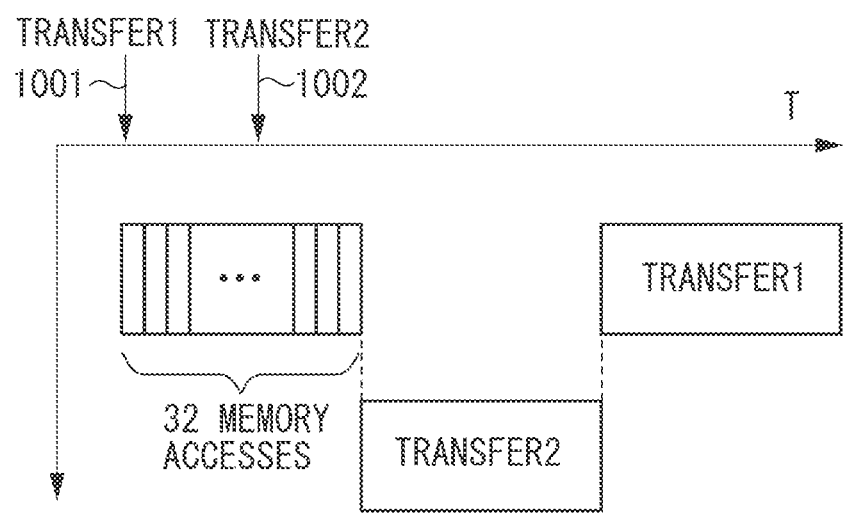
Figure 10C:
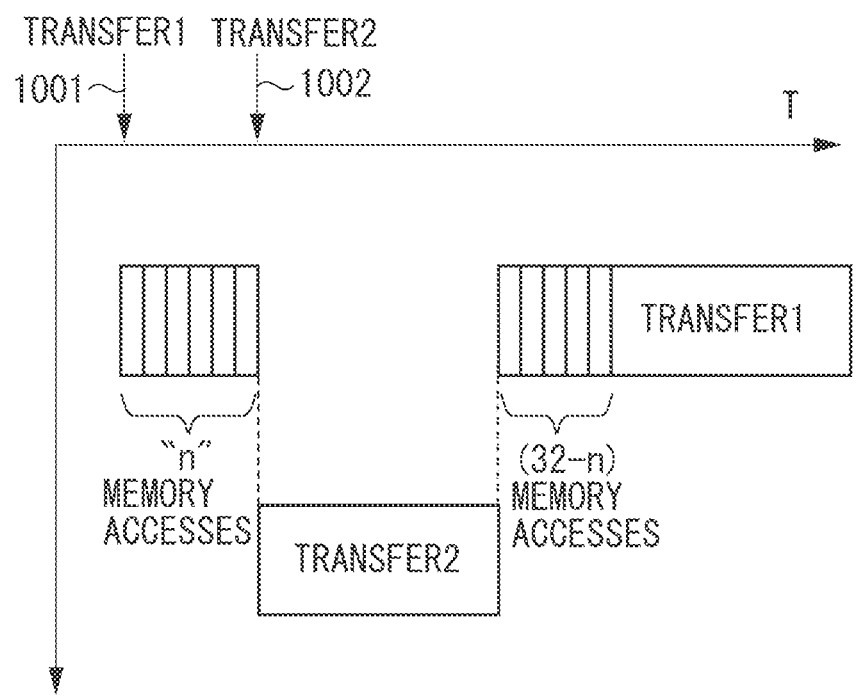
FIG. 10C is a pattern diagram illustrating a status where a memory control circuit of the present invention processes two transfers having different priorities.

FIGS. 10A to 10C illustrate a state where the memory access is allowed to cut in. The horizontal axis illustrated in FIGS. 10A to 10C indicates an elapsed time, and the vertical axis illustrated therein indicates the transfer processed by the memory control circuit. In an example of FIGS. 10A to 10C, the memory control circuit receives a 128-beat transfer 1 (1 megabyte (MB), write, and low priority) from the on-chip bus at timing of an arrow 1001, and receives a transfer 2 (the number of the bits for one 128-beat transfer, write, and high priority) from the on-chip bus at timing of an arrow 1002.

FIGS. 10A and 10B illustrate a state where the conventional memory control circuit performs the processing. Since the transfer 2 has the higher priority than that of the transfer 1, the memory control circuit attempts to allow the transfer 2 to cut in on the transfer 1. However, actually, as illustrated in FIG. 10B, the one 128-beat (one unit) transfer can be realized by 32 memory access commands. Therefore, until issuing a plurality of memory access commands corresponding to the transfer unit for a first one 128-beat is completed for the transfer 1, the conventional memory control circuit does not issue the memory access command for the transfer 2. FIG. 10B illustrates the state where only the first transfer of the transfer 1 is divided for better understanding, but actually the subsequent transfers are also divided.

FIG. 10C illustrates a state where the transfers 1 and 2 are processed using the memory control circuit 100 according to the present exemplary embodiment. The memory control circuit 100 can issue the memory access command for the transfer 2 earlier than the conventional memory control circuit after receiving the transfer 2. When the transfer 2 is received, an "n"th memory access for the transfer 1 is being issued, and after the transfer 2 is processed, the rest (32−n) of the memory accesses are resumed.

As described above, according to the present exemplary embodiment, even if the memory access based on a preceding transfer has been started, the subsequent memory access based on the high-priority transfer is allowed to cut in to be transferred, thereby improving a transfer efficiency for the high-priority transfer. Originally, as for the protocol of the on-chip bus, since the high priority is allocated to the transfer requiring real-time guarantee, it can be said that according to the present exemplary embodiment, a real-time property in the system can be improved.

A configuration of the memory control circuit using the DDR-SDRAM in which a function for interrupting a burst access (burst transfer) is prescribed will be described.

Figure 4:
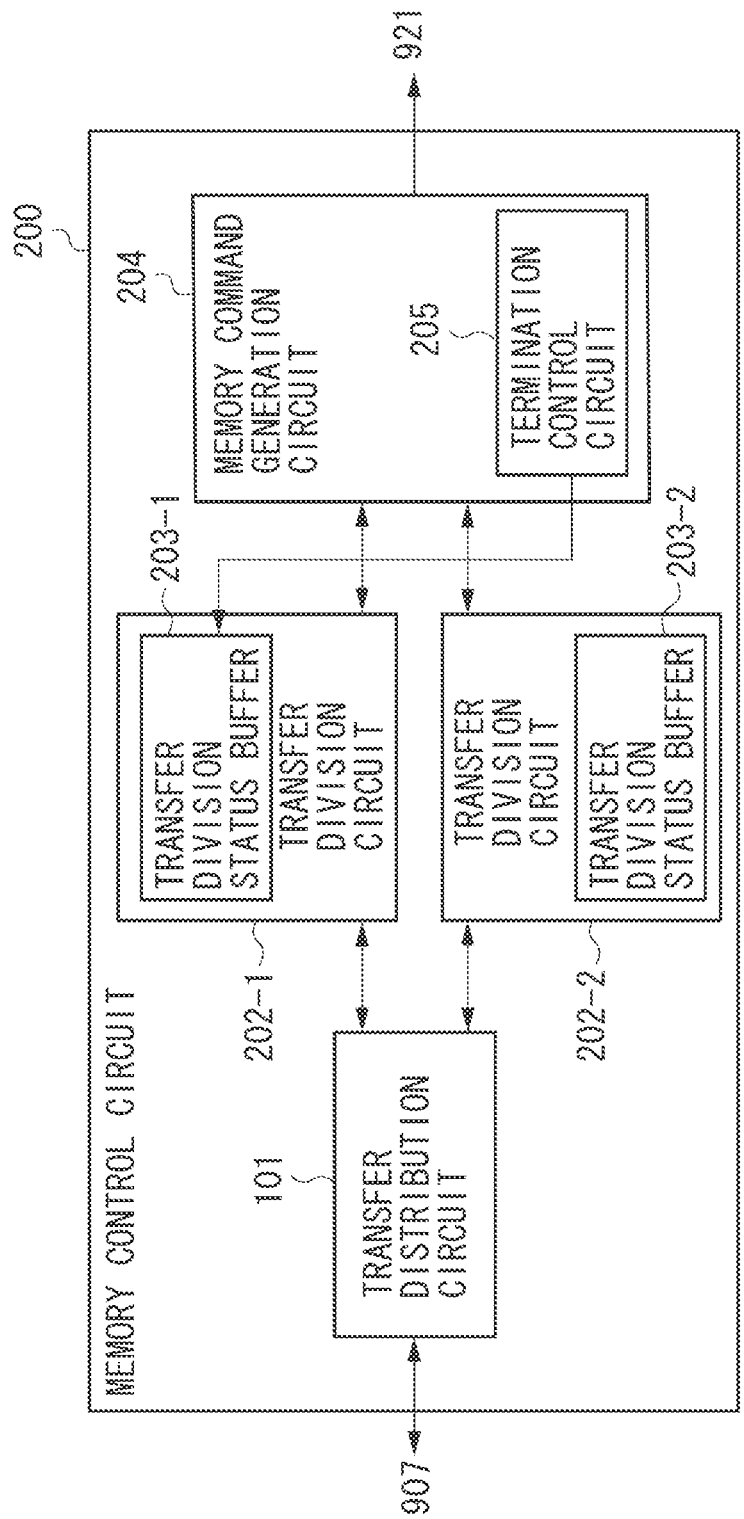
FIG. 4 is a block diagram illustrating a schematic configuration of the memory control circuit.

FIG. 4 illustrates a schematic configuration of a memory control circuit 200 according to the present exemplary embodiment. Same reference numerals are given to same configurations in the first exemplary embodiment, and when the configuration has the same function, it will not be repeatedly described.

The transfer distribution circuit 101 receives the transfer instruction from the on-chip bus, and transmits the low-priority transfer instruction to a transfer division circuit 202-1 and the high-priority transfer instruction to a transfer division circuit 202-2. The transfer division circuits 202-1 and 202-2 generate the memory access request based on the received transfer instruction. A memory command generation circuit 204 selects the memory access request having the high priority from among the memory access request from a plurality of transfer division circuits 202-1 and 202-2 and, based on the selected memory access request, issues the memory command accompanied by the burst access to the memory device.

The transfer division circuit 202 makes a transfer division status buffer 203 hold information required for generating the rest of the memory access request each time the transfer instruction is divided. According to the present exemplary embodiment, the rest of the burst length for completing the transfer instruction is stored.

During the burst access, if a termination control circuit 205 detects the memory access request based on the transfer instruction having the higher priority, the burst access based on the lower-priority transfer instruction is interrupted. If the burst access is interrupted, the termination control circuit 205 notifies a transfer division status buffer 203-1 of how long the rest of the burst length for completing the memory access is. If the memory access is interrupted, the memory command generation circuit 204 receives the memory access request from a transfer division circuit 202-2, and performs the memory access. The transfer division status buffer 203-1 adds the burst length that has not been processed to the burst length that is not divided.

Figure 5:
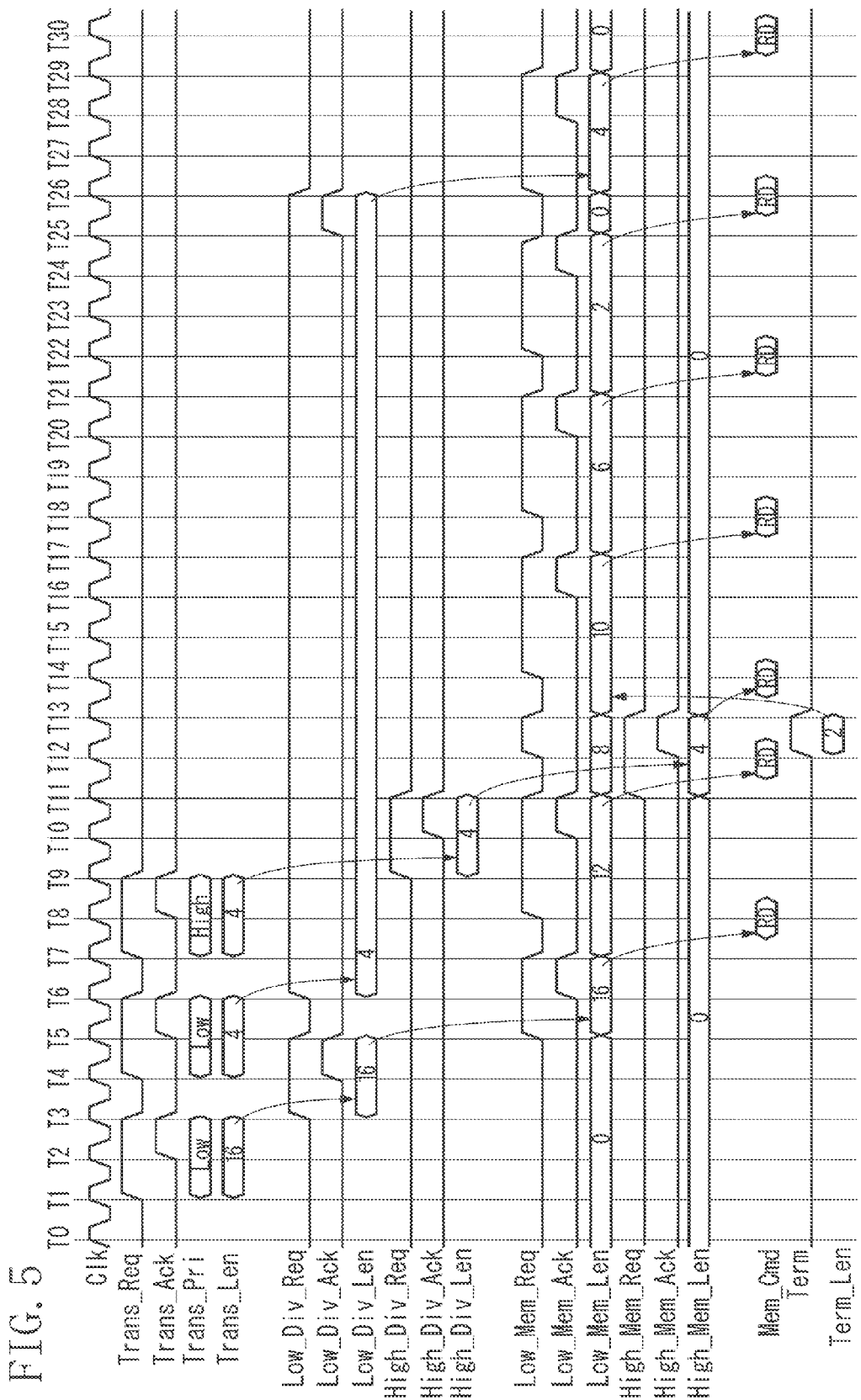
FIG. 5 is a timing chart illustrating operational waveforms of the memory control circuit.

FIG. 5 is a timing chart illustrating operational waveforms of various types of signals of the memory control circuit 200 according to the present exemplary embodiment. As for the horizontal axis and the vertical axis, the similar aspects to that of FIG. 3 will not be repeatedly described. An example where three transfer instructions (transfer instructions A, B, and C) are received from the on-chip bus and processed will be described herein. Further, all transfer instructions are the read transfers. The transfer instruction A has the low priority, and its burst length is 16. The transfer instruction B has the low priority, and its burst length is 4. The transfer instruction C has the high priority, and its burst length is 4. Further, an amount of data for one memory access corresponds to an amount of data for 4 beats of the on-chip bus, and requires 4 cycles for the read access.

As for each of the Clk signal, Trans_Req signal, Trans_Ack signal, Trans_Pri signal, Trans_Len signal, Low_Div_Req signal, Low_Div_Ack signal, Low_Div_Len signal, High_Div_Req signal, High_Div_Ack signal, and High_Div_Len signal, a definition of each signal and a state of transition are substantially the same as those of FIG. 3, and thus will not be repeatedly described.

As for each of the Low_Mem_Req signal, Low_Mem_Ack signal, Low_Mem_Len signal, High_Mem_Req signal, High_Mem_Ack signal, and High_Mem_Len signal, the definition of each signal is the same as that of FIG. 3, however, the state of the transition is different from that of FIG. 3. The details will be described below. The difference is caused by re-adding a value of the burst length that is not transferred to the transfer division status buffer when the memory command generation circuit 204 interrupts the burst access.

A term signal indicates that the memory access is interrupted, and is output from the termination control circuit 205 to the transfer division status buffer 203-1. A Term_Len signal indicates the unprocessed (not transferred) burst length when the burst access is interrupted, and is output from the termination control circuit 205 to the transfer division status buffer 203-1.

Subsequently, the transition of various types of signals for each clock cycle will be described in an order of the transition. The descriptions at T0 to T11 are similar to those of the timing chart illustrated in FIG. 3, and thus will not be repeatedly described. The status at T11 indicates the status right before the second read command based on the transfer instruction A having the low priority is issued, and also the status where the processing based on the transfer instruction B is suspended by the transfer division circuit 202-1 and right before the memory access request based on the transfer instruction C is transmitted to the memory command generation circuit 204.

At T12, as for the transfer instruction A, in response to the assertion of the Low_Mem_Ack signal, the Low_Mem_Len signal held by the transfer division status buffer 203-1 is decremented by four. In parallel to this processing, the memory command generation circuit 204 issues the read command based on the transfer instruction A to the memory device. On the other hand, as for the transfer instruction C, the transfer division circuit 202-2 asserts the High_Mem_Req signal to output the memory access request based on the transfer instruction C to the memory command generation circuit 204.

At T13, as for the transfer instruction C, the termination control circuit 205 responds the memory access request from the transfer division circuit 202-2 during performing the memory access, to assert the Term signal. In parallel to this processing, the termination control circuit 205 informs the transfer division circuit 202-1 that the transfer for two beats has not been processed due to interruption of the burst access for the transfer instruction A. Further, the memory command generation circuit 204 selects the memory access request based on the transfer instruction C without waiting completion of the read command based on the transfer instruction A. The High_Mem_Ack signal is asserted herein, and then the memory access request from the transfer division circuit 202-2 is selected.

At T14, as for the transfer instruction C, in response to the assertion of the High_Mem_Ack signal, the High_Mem_Len signal of the transfer division status buffer 203-2 is decremented by four. In parallel to this processing, the memory command generation circuit 204 issues the read command based on the transfer instruction C to the memory device. At this point, the High_Mem_Len signal becomes "0", which indicates that the memory access for the transfer instruction C has been completed. On the other hand, as for the transfer instruction A, the transfer division status buffer 203-1 is notified that the burst access based on the transfer instruction A is interrupted and the transfer for two beats has not been processed, and then an unprocessed amount of the Low_Mem_Len signal is added to update the transfer instruction.

At T17 to T26, as for the transfer instruction A, the transfer division circuit 202-1 outputs the memory access request to the memory command generation circuit 204 in consideration of the notification of interruption of the burst access, and resumes the memory access based on the transfer instruction A.

After the memory access based on the transfer instruction A is completed, at T26, the transfer division circuit 202-1 asserts the Low_Div_Ack signal and receives the transfer instruction B. At T29, the memory access request based on the transfer instruction B is selected by the memory command generation circuit 204, and at T30, the memory command based on the transfer instruction B is issued to the memory device. At this point, the Low_Mem_Len signal becomes "0", which indicates that the memory command based on the transfer instruction B is completed.

As described above, according to the present exemplary embodiment, even while the burst access based on the preceding transfer is being performed, the memory access based on the subsequent high-priority transfer can be cut in using the burst termination. Therefore, the transfer efficiency for the high-priority transfer can be further improved.

Figure 6:
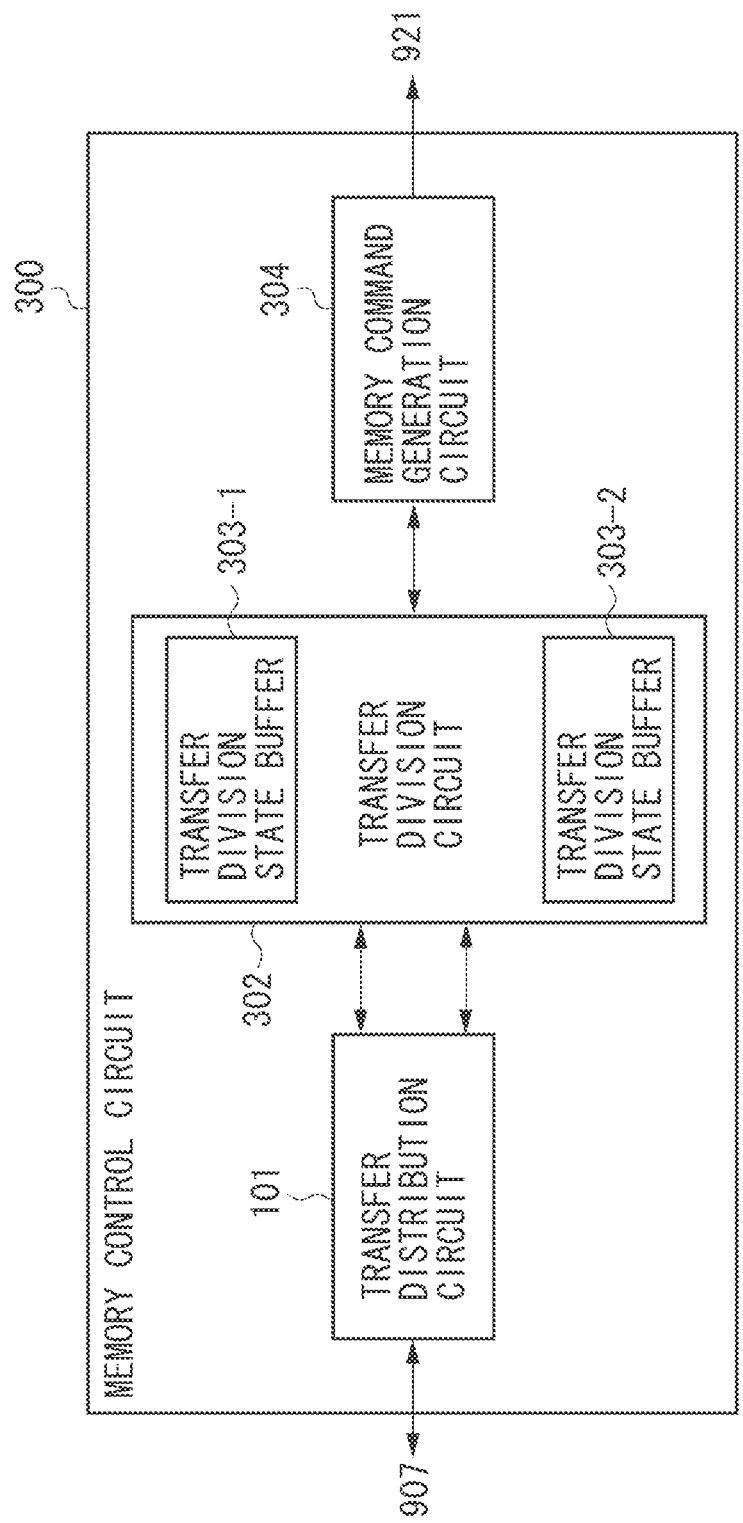
FIG. 6 is a block diagram illustrating a schematic configuration of the memory control circuit.
Figure 7:
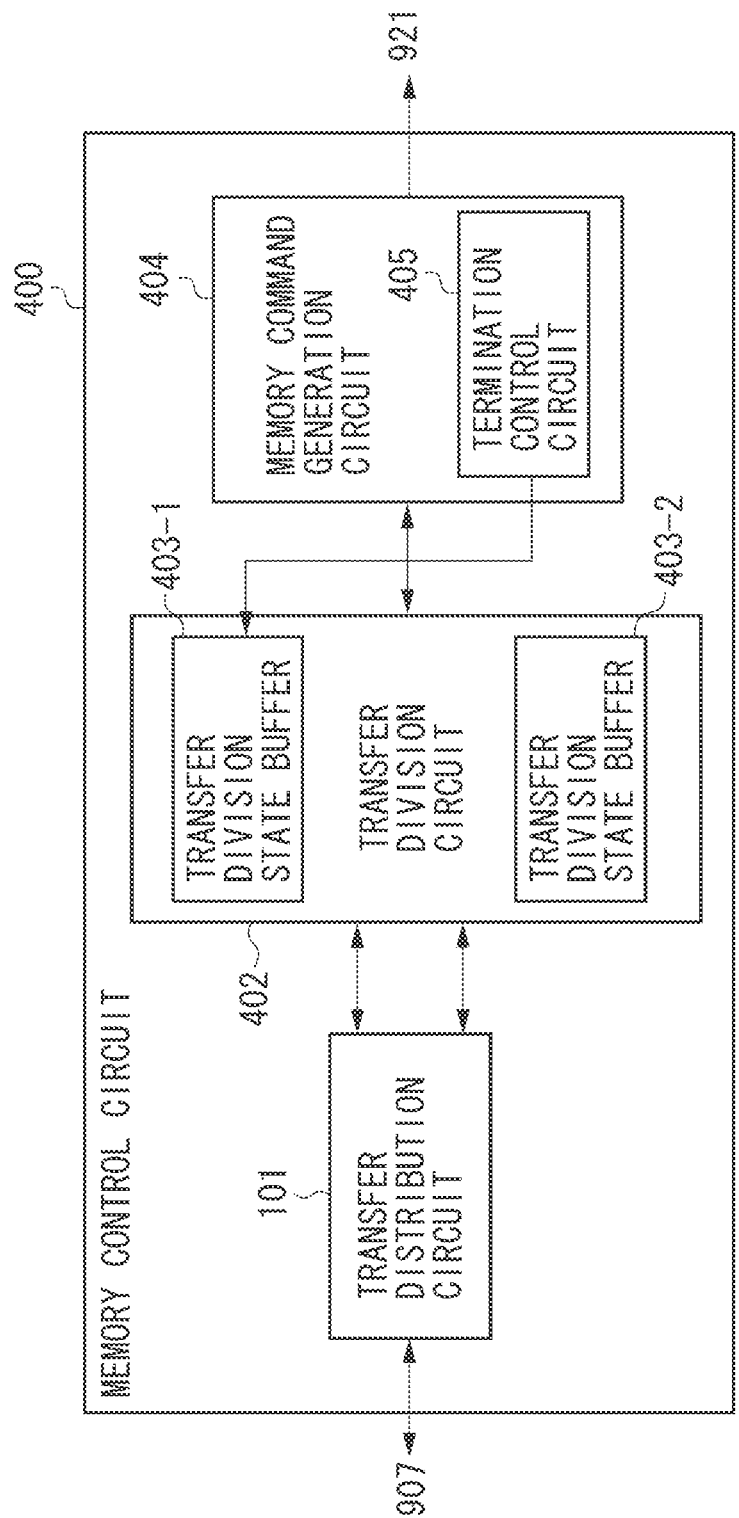
FIG. 7 is a block diagram illustrating a schematic configuration of the memory control circuit.

To simplify the description of the above-described exemplary embodiment, the transfer division circuits corresponding to the priority are explicitly, configured in separation, however, as illustrated in FIGS. 6 and 7, if the transfer division status buffer is provided for each priority, an output system to the memory command generation circuit may be shared. By configuring the memory control circuit as illustrated in FIGS. 6 and 7, the number of the gates of the transfer division circuit can be reduced. Since the transfer division circuit is shared in the configuration of FIGS. 6 and 7, an importance level of the transfer distribution circuit is lowered. Therefore, when the transfer division circuit is shared, the transfer division circuit may be integrally configured with the transfer distribution circuit.

In the above-described exemplary embodiment, to simplify the description, the read transfer is described as the example, however, the transfer instruction may be a write transfer to the memory device, or both the read transfer and the write transfer may be included. Further, the example where the transfer instruction is distributed to two of the low priority and the high priority is described, however, the priority may be distributed to three or more. When the priority is distributed to three or more priorities, the transfer division status buffer corresponding to the priorities needs to be increased. Further, the memory command generation circuit needs a configuration in which the memory access request having the high priority is selected from among the plurality of the memory access requests, and an appropriate transfer division status buffer from among the plurality of transfer division status buffers is notified of interrupted burst access. However, as an arbitration circuit, a general configuration may be used, or an identifier for identifying from which transfer division system (priority) the memory access request is transmitted may be added, and then the termination control circuit or a memory command generation circuit may select the memory access request according to the identifier.

According to the above-described exemplary embodiment, the example where the processing of the transfer instruction C overtakes that of the transfer instruction A or the transfer instruction B to perform processing is described. In such a case, a dependence relationship between the transfers about, for example, whether access regions of the memories are located in a same region is confirmed, and based on the dependence relationship, permission or prohibition on the overtaking may be controlled. For example, suppose that an access region of the transfer A has an address of 0 0 to 0 7F, an access region of the transfer B has an address of 0 80 to 0 9F, and an access region of the transfer C has an address of 0 60 to 0 7F. In this case, since the access region of the transfer C overlaps with the access region of the transfer A, the overtaking of the transfer C is prohibited, and the transfer C is controlled not to overtake the transfer A and the transfer B.

According to the above-described exemplary embodiment, the example where the information corresponding to the priority is previously appended to the transfer from the on-chip bus is described, however, the memory access control circuit may identify an issuer of the transfer instruction such as the bus and the master, and then may determine and give the priority of the transfer depending on the bus and the master. At this point, information in which the identifier and the priority of each master are associated with each other may be stored in the memory control circuit.

Further, according to the above-described exemplary embodiment, the configuration where only one transfer instruction is held by the transfer distribution circuit is described, however, a first in, first out (FIFO) buffer (queue) 802 may be provided in the transfer distribution circuit 101 and a plurality of transfers may be held. For example, the buffer 802 is provided for each priority as illustrated in FIG. 8A, and the transfer instruction is distributed by a selector 801. When the buffer is provided for each priority, an order of the transfers having the same priority may be changed to improve the efficiency of the access to the memory device. For example, arrangement of the transfers may be changed to continue the write accesses to a different bank, or to continue the accesses to the same page of the same bank, or to make change between read and write be reduced.

Further, according to the above-described exemplary embodiment, the transfer division circuit includes the transfer division status buffer, and the memory command generation circuit includes the termination control circuit, however, the transfer division status buffer and the termination control circuit may be arranged outside the transfer division circuit and the memory command generation circuit, as long as they can communicate with the transfer division circuit and the memory command generation circuit.

Further, as illustrated in FIG. 8B, the buffer is provided only for the low priority. The buffer does not need to be provided for the transfer having the priority whose order does not need to be changed, and thus the circuit can be more reduced in size than the configuration illustrated in FIG. 8A provided with the buffer for each priority.

Furthermore, in the above description, the printer having the copy function is described with reference to FIG. 9, however, the present invention can be applied to the memory including the SDRAM.

In each exemplary embodiment described above, to simplify the description, the diagrams for each exemplary embodiment are used. When a plurality of types of memory devices are configured and a plurality of memory control circuits are used depending on a type of the memory device, the present invention can be also implemented by combining a plurality of exemplary embodiments. Such a case corresponds to solving an individual problem corresponding to an effect of each exemplary embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-176027 filed Aug. 8, 2012, which is hereby incorporated by reference herein in its entirety.

What is claimed is:

1. A memory control apparatus configured to issue a plurality of memory commands in a memory access unit based on a transfer instruction, the memory control apparatus comprising:
   a reception unit configured to receive a transfer instruction;
   a plurality of output units configured to each hold at least one transfer instruction and an output status based on the transfer instruction, and, based on the transfer instruction, each output a plurality of memory access requests in a memory access unit; and
   a command generation unit configured to, based on the plurality of memory access requests, issue a memory command to a memory device,
   wherein the command generation unit is configured to issue a second memory command that is received by the reception unit after a first transfer instruction and is based on a memory access request related to a second transfer instruction held by a second output unit so as to allow the second memory command to cut in on a plurality of memory commands based on a plurality of memory access requests related to the first transfer instruction held by a first output unit, wherein the first output unit comprises a plurality of status buffers and is configured to, in a case where the memory access request for the second transfer instruction having a high priority is completed, based on a processing status held by a status buffer corresponding to the first transfer instruction having a low priority, resume to output a memory access requirement based on the first transfer instruction, and wherein the plurality of status buffers is provided only for the first transfer instruction having the low priority.

2. The memory control apparatus according to claim 1, wherein the reception unit is configured to receive a transfer instruction transferred in a first transfer unit, wherein the command generation unit is configured to, based on the transfer instruction in one unit of the first transfer unit, issue a plurality of memory commands in a memory access unit, which is a second transfer unit smaller than the first transfer unit, and wherein the command generation unit is configured to issue a second memory command that is received by the reception unit after the first transfer instruction and is based on a memory access request related to the second transfer instruction having higher priority than that of the first transfer instruction so as to allow the second memory command to cut in on the plurality of memory commands based on the first transfer instruction.

3. The memory control apparatus according to claim 1, wherein, in a case where a memory access based on the second transfer instruction is cut in on a memory access based on the first transfer instruction, the output unit is configured to interrupt processing for outputting the memory access related to the first transfer instruction.

4. The memory control apparatus according to claim 1, wherein the transfer instruction includes a burst access to the memory device, and wherein the command generation unit comprises a termination control circuit configured to interrupt the burst access to the memory device.

5. A memory control circuit configured to convert a plurality of transfer instructions into a memory access unit and issue the plurality of transfer instructions as memory commands, the memory control apparatus comprising:

a transfer distribution circuit configured to distribute the plurality of transfer instructions for each priority;

a plurality of transfer division circuits configured to convert the plurality of transfer instructions distributed by the transfer distribution circuit into the memory access unit and output memory access requests; and a memory command generation circuit configured to, based on the memory access requests, generate a memory command to be issued to a memory device, wherein the transfer division circuit comprises a plurality of status buffers for holding a division status, wherein the memory command generation circuit is configured to, in a case where the plurality of transfer division circuits issue the memory access requests, preferentially process a memory access request related to a high-priority transfer instruction using the plurality of status buffers to resume a memory access request related to the low-priority transfer instruction after processing the memory access request related to the high-priority transfer instruction, and wherein the plurality of status buffers is provided only for the memory access request with the low-priority transfer instruction.

6. The memory control apparatus according to claim 5, wherein the memory command generation circuit is configured to select a subsequent memory access request each time the memory access in a predetermined unit is completed.

7. The memory control apparatus according to claim 5, further comprising a termination control circuit, wherein the memory command generation circuit is configured to, in a case where a memory access request based on a high-priority transfer instruction is detected, interrupt the memory access by the termination control circuit and start processing of the memory access request based on the high-priority transfer instruction.

8. The memory control apparatus according to claim 5, wherein the transfer instruction includes information indicating the priority.

9. The memory control apparatus according to claim 5, wherein the transfer distribution circuit is configured to identify an issuer of a received transfer instruction and append a priority of the transfer instruction.

10. A memory control apparatus configured to receive a plurality of transfers, divide the plurality of transfers into a memory access unit, and issue the plurality of transfers to a memory, the memory control apparatus comprising:

a transfer distribution circuit configured to output a transfer division request for a priority of each of the plurality of transfers;

a transfer division circuit configured to, upon reception of the transfer division request, divide the transfer division request into a memory access unit and issue a memory access request; and a memory command generation circuit configured to, upon reception of the memory access request, generate a memory command to be issued to a memory, wherein the transfer division circuit comprises a plurality of transfer division status buffers for holding a transfer status during division processing for each priority, and is configured to, in a case where the transfer division request for a higher-priority transfer is received during division processing of the transfer division request, start a division processing based on the higher-priority transfer with the status of the transfer division request during the division processing held in the status buffer, and in a case where a memory access based on the higher-priority transfer is completed, resume the division processing based on the transfer division request interrupted based on the status held by the status buffer using the plurality of transfer division status buffers to resume a memory access request related to the lower-priority transfer after processing the memory access request related to the high-priority transfer, and wherein the plurality of transfer division status buffers are provided only for the memory access request of the lower-priority transfer.

11. An information processing apparatus comprising:
a plurality of bus masters;
a dynamic random access memory (DRAM);
a memory bus;
an on-chip bus; and
a memory control apparatus connected to the DRAM via the memory bus and connected to the plurality of bus masters via the on-chip bus, wherein the memory control apparatus comprises:
a reception unit configured to receive a transfer instruction indicating a burst access from the plurality of bus masters to the DRAM;
a plurality of conversion units configured to convert the transfer instruction into an access unit to the DRAM; and
an issuance unit configured to, based on the transfer instruction converted by at least one of the plurality of conversion units, issue a memory command to the DRAM,
wherein the issuance unit is configured to, in a case where another transfer instruction having higher priority is received during the burst access to the DRAM, interrupt the burst access and start a memory access based on the another transfer instruction,
wherein the issuance unit is configured to, after processing the another transfer instruction having higher priority, resume the burst access to the DRAM.

12. The information processing apparatus according to claim 11,
wherein the plurality of conversion units each comprises a status holding unit configured to indicate how much memory access for a transfer instruction during a burst access has been performed; and
wherein the issuance unit is configured to, according the interruption of the burst access, re-add a burst length that has not been transferred to the status holding unit for the interrupted burst access.

13. An information processing apparatus according to claim 11, wherein the reception unit comprises a queue holding a plurality of transfer instructions for at least one priority, and is configured to change arrangement of the plurality of transfer instructions held by the queue.

14. A control method of a memory control apparatus configured to issue a memory command in a memory access unit based on a transfer instruction, the memory control apparatus including a reception unit configured to receive a transfer instruction, a plurality of output units for each holding at least one transfer instruction and an output status based on the transfer instruction, and, based on the transfer instruction, each outputting a memory access request, and a command generation unit configured to, based on the memory access request, issue the memory command to a memory device, the control method comprising issuing a memory command that is received by the reception unit after a first transfer instruction and is based on a memory access request related to a second transfer instruction held by a second output unit so as to allow the memory command to cut in on a plurality of memory commands based on a plurality of memory access requests related to the first transfer instruction held by a first output unit using a plurality of status buffers to resume the memory access request related to the first transfer instruction after processing the memory access request related to the second transfer instruction, wherein the plurality of status buffers is provided only for the memory access request with the first transfer instruction.

15. A control method of a memory control circuit configured to convert a plurality of transfer instructions into a memory access unit and issue the transfer instructions as memory commands, the memory control circuit including a transfer distribution circuit configured to distribute the plurality of transfer instructions for each priority, a plurality of transfer division circuits configured to convert the transfer instruction distributed by the transfer distribution circuit into the memory access unit and output a memory access request, and a memory command generation circuit configured to, based on the memory access request, generate a memory command to be issued to a memory device, the control method comprising:
preferentially processing, in a case where the plurality of transfer division circuits issue the memory access requests, the memory access request related to a high-priority transfer instruction using a plurality of transfer division status buffers to resume a memory access request related to the lower-priority transfer instruction after processing the memory access request related to the high-priority transfer instruction, and
wherein the plurality of transfer division status buffers are provided only for the memory access request of the lower-priority transfer instruction.

16. A control method of an information processing apparatus that includes a plurality of bus masters, a dynamic random access memory (DRAM), a memory bus, an on-chip bus, a receiving unit configured to receive transfer instructions indicating burst access from the plurality of bus masters to the DRAM, and a memory control circuit including a plurality of conversion units configured to convert the transfer instruction into an access unit to the DRAM, and an issuance unit configured to, based on the transfer instruction converted by at least one of the plurality of conversion units, issue a memory command to the DRAM via the memory bus, the control method comprising:
interrupting, in a case where another transfer instruction having higher priority is received during a burst access to the DRAM, the burst access and starting a memory access based on the another transfer instruction,
resuming, after processing the another transfer instruction having higher priority, the burst access to the DRAM.

17. A memory control apparatus configured to issue a plurality of memory commands in a memory access unit based on a transfer instruction, the memory control apparatus comprising:
a reception unit configured to receive a transfer instruction that is issued by a plurality of bus masters via a on-chip bus;
a plurality of output units configured to each hold at least one transfer instruction and an output status based on the transfer instruction, and, based on the transfer instruction, each output a plurality of memory access requests in a memory access unit; and
a command generation unit configured to, based on the plurality of memory access requests, issue a memory command to a memory device,
wherein the command generation unit is configured to issue a second memory command that is received by the reception unit after a first transfer instruction and is based on a memory access request related to a second transfer instruction held by a second output unit so as to allow the second memory command to cut in on a plurality of memory commands based on a plurality of memory access requests related to the first transfer instruction held by a first output unit.

18. A memory control circuit configured to convert a plurality of transfer instructions into a memory access unit and issue the plurality of transfer instructions as memory commands, the memory control apparatus comprising:
a transfer distribution circuit configured to distribute the plurality of transfer instructions that is issued by a plurality of bus masters via a on-chip bus for each priority;
a plurality of transfer division circuits configured to convert the plurality of transfer instructions distributed by the transfer distribution circuit into the memory access unit and output memory access requests; and a memory command generation circuit configured to, based on the memory access requests, generate a memory command to be issued to a memory device, wherein the transfer division circuit comprises a plurality of status buffers for holding a division status, and wherein the memory command generation circuit is configured to, in a case where the plurality of transfer division circuits issue the memory access requests, preferentially process a memory access request related to a high-priority transfer instruction.

19. A memory control apparatus configured to issue a plurality of memory commands in a memory access unit based on a transfer instruction, the memory control apparatus comprising:

a reception unit configured to receive a transfer instruction that is issued by a plurality of bus masters via a on-chip bus;

a plurality of output units configured to each hold at least one transfer instruction and an output status based on the transfer instruction, and, based on the transfer instruction, each output a plurality of memory access requests in a memory access unit; and a command generation unit configured to, based on the plurality of memory access requests, issue a memory command to a memory device, wherein the command generation unit is configured to issue a second memory command that is received by the reception unit after a first transfer instruction and is based on a memory access request related to a second transfer instruction held by a second output unit so as to allow the second memory command to cut in on a plurality of memory commands based on a plurality of memory access requests related to the first transfer instruction held by a first output unit, and wherein the reception unit is configured to identify an issuer of the received transfer instruction and append a priority of the transfer instruction.

20. The memory control apparatus according to claim 19, wherein the receiving unit is configured to hold a transfer instruction having a low priority of an issuer among transfer instructions received by the receiving unit in a cue and rearrange the transfer instructions, and wherein the receiving unit is configured not to hold a transfer instruction having a high priority of the issuer among the instructions received by the receiving unit in the cue or not to rearrange the transfer instructions.

* * * * *